United States Patent
Lind et al.

[11] Patent Number: 5,931,115
[45] Date of Patent: Aug. 3, 1999

[54] METHOD OF MILKING AND A MILKING APPARATUS

[75] Inventors: Ole Lind, Tumba; Kerstin Svennersten, Brunna; Benny Ornerfors, Jarfalla, all of Sweden

[73] Assignee: Alfa Laval Agri AB, Tumba, Sweden

[21] Appl. No.: 09/051,521

[22] PCT Filed: Sep. 30, 1996

[86] PCT No.: PCT/SE96/01222

§ 371 Date: Jul. 1, 1998

§ 102(e) Date: Jul. 1, 1998

[87] PCT Pub. No.: WO97/13403

PCT Pub. Date: Apr. 17, 1997

[30] Foreign Application Priority Data

Oct. 13, 1995 [SE] Sweden .................................. 9503588

[51] Int. Cl.[6] ............................................. A01J 7/00
[52] U.S. Cl. ............................................... 119/14.02
[58] Field of Search ...................... 119/14.01, 14.02, 119/14.03, 14.08, 14.1

[56] References Cited

U.S. PATENT DOCUMENTS

| | | |
|---|---|---|
| 4,011,838 | 3/1977 | Nordegren et al. . |
| 4,034,713 | 7/1977 | Umbaugh . |
| 4,223,635 | 9/1980 | Akerman . |
| 4,685,422 | 8/1987 | Middel et al. ........................ 119/14.13 |
| 4,805,557 | 2/1989 | Van Der Lely et al. ............. 119/14.08 |
| 5,020,477 | 6/1991 | Dessing et al. ...................... 119/14.08 |
| 5,379,721 | 1/1995 | Dessing et al. ...................... 119/14.08 |
| 5,666,903 | 9/1997 | Bull et al. ............................ 119/14.08 |

FOREIGN PATENT DOCUMENTS

| | | |
|---|---|---|
| A2 332232 | 1/1986 | European Pat. Off. . |
| A3 332232 | 1/1986 | European Pat. Off. . |
| 480542 | 9/1989 | European Pat. Off. . |
| 468588 | 7/1991 | European Pat. Off. . |
| 191517 | 12/1991 | European Pat. Off. . |
| 657098 | 12/1994 | European Pat. Off. . |
| 3609275 | 9/1987 | Germany . |
| 4300884 | 7/1993 | Germany . |
| 1741678 | 6/1992 | U.S.S.R. . |

*Primary Examiner*—Thomas Price
*Attorney, Agent, or Firm*—Hovey, Williams, Timmons & Collins

[57] ABSTRACT

An animal may be milked by the use of at least one milking apparatus by the following steps: operating first milking apparatus of the milking apparatus a normal mode during a first milking procedure, automatically determining by determining device when the milking of an animal during the first milking procedure does not succeed, and automatically operating second milking apparatus of the milking apparatus in a special mode during a following second milking procedure of the animal for which the milking did not succeed in the first milking procedure.

22 Claims, 2 Drawing Sheets

METHOD OF MILKING AND A MILKING APPARATUS

BACKGROUND OF THE INVENTION

1. Field of the Invention

The present invention relates to a method of milking animals by the use of at least one milking apparatus. The invention also relates to a milking apparatus.

2. Description of the Prior Art

Milking machines for milking of animals are continuously developed to more and more sophisticated fully automatic milking machines, which include a robot provided to automatically apply the teatcups of the milking machine to the teats of an animal. This is not an easy task and since the animals are living beings their behaviour when entering a milking station may never be fully predictable. Therefore when designing the robot of the milking machine one has for example to consider that the udder and the teats of the animal always may move. In recent time this has resulted in a development towards a constantly increasing degree of complexity of the control programs and the milking robot constructions. The aim of this development is to obtain an as high as possible success rate in order to avoid the problems which may occur when the milking robot does not manage to apply the teatcups to the teats so that no milking takes place. This development means that the cost for the automatic milking machine will increase. However, there is also a tendency that this development towards a high success rate results in the disadvantage that more time has to be spent at each milking occasion, and thus the capacity of the milking machine is not utilized in an optimal manner. Furthermore, despite of this development there will always be situations in which the milking of an animal does not succeed, for example because the robot does not manage to apply one or more teatcups to the teats of one or more animals. It may for example happen that the robot does not find or recognize all the teats. Furthermore, the milking may not succeed because the milking machine does not manage to extract the desired amount of milk from the udder. This may have many grounds, the stimulation of the cow is insufficient, the animal is ill, etc.

EP-A-480 542 discloses a method of automatically milking an animal by means of a milking robot including a robot arm carrying one or more teatcups and coupling means for applying each teatcup to a relevant teat of the animal's udder. EP-A-480 542 is concerned with the problem of checking whether the teatcup is connected correctly to the teat and in particular this check is performed by a temperature measurement, since in the milk flow the temperature is higher than outside.

SUMMARY OF THE INVENTION

The object of the present invention is to overcome the disadvantages mentioned above and to provide a method and an apparatus, by which the overall efficiency of the milking procedure is improved. In particular the present invention aims to improve the utilization of the capacity of the milking apparatus and to reduce the cost of the milking apparatus.

This object is obtained by the initially mentioned method comprising the following steps: operating the milking apparatus in a normal mode during a first milking procedure for each animal, automatically determining when the milking of an animal during said first milking procedure does not succeed, and automatically operating the milking apparatus in a special mode during a following second milking procedure of the animal for which the milking did not succeed in the first milking procedure. By means of this method the majority of the animals may be milked according to the normal mode of operation. This normal mode makes use of a predetermined, limited time period for the milking of each animal. Thus the capacity of the milking apparatus may be well utilized, since the majority of the animals may be milked during this limited time period. These animals for which the milking did succeed then will be milked according to said first normal mode during a following second milking procedure. The relatively small number of animals for which this normal mode of operation is not sufficient for a successful milking may be determined and in a following milking procedure they may be milked according to the special mode of operation. The present invention at least partly relies on the understanding that in a modern milking system, in which the animals may be milked more than two times per day, it may not be necessary to obtain a successful milking of each teat at each milking occasion. When for example the milking apparatus does not find one teat of an animal, milking of the other teats of this animal may be completed and the milking of said one teat may take place in a second milking procedure which may follow after a certain period of time.

If the milking according to the special mode of operation takes place a certain time interval after the milking according to the normal mode of operation, the method may comprise the step of recording the animal for which the milking of said first milking procedure did not succeed. This is also advantageous when the milking according to the special mode of operation takes place at a location which is remote from the location of the milking according to the normal mode of operation.

According to one embodiment of the invention said special mode of operation may comprise the step of identifying the reason why the milking did not succeed in the first milking procedure. Such unsuccessful milking may for example be due to the fact that the milking apparatus does not manage to extract the desired milk amount, for example because of insufficient stimulation, or that the milking apparatus does not manage to find one or more teats of an animal.

According to a further embodiment said special mode of operation comprises a more sophisticated treatment of the animal than said normal mode in order to enable the milking procedure to succeed. Said more sophisticated treatment may for example take into account individual characteristics of each animal, such as the lactation situation, and may also last for a longer period of time than the treatment of the normal mode of operation without negatively influencing the overall efficiency of the milking procedures, since the more sophisticated treatment is needed only for a relatively small number of animals. Furthermore, said special mode of operation may be performed when a predetermined time interval has elapsed since the first of a series of unsuccessful milkings.

According to a further embodiment of the invention the determining steps comprises determining when the milking of a teat of an animal does not succeed. In a situation, for example, when an unsuccessful milking is a result of a defect in one single teat it is more efficient to look upon each individual teat rather than each animal. Consequently, the recording step may comprise recording the teat and the animal for which the milking did not succeed. Furthermore, said operating step in a normal mode may comprise completing the milking of the teats of an animal for which teats milking does succeed.

According to a further embodiment of the invention said normal and special modes of operation are performed in the same milking apparatus. Thereby control means may be provided to control the milking apparatus in the normal and special mode of operation, respectively. Furthermore, at least two milking apparatuses may be used and said normal and special modes of operation may be performed in the two milking apparatuses, respectively.

According to a further embodiment of the invention, the milking apparatus comprises teatcups and applying means provided to apply the teatcups to the teats of the animal, the applying means in said normal mode of operation follows a normal search algorithm for finding the teats and applying the teatcups to the teats, and in the determining step it is determined that the milking does not succeed if the applying means does not find a predetermined number of teats or does not succeed in applying the teatcups to said predetermined number of the teats. This embodiment is in particular concerned with the problem of the milking apparatus not finding one or more teats of an animal or not managing to apply one or more teatcups to one or more teats of an animal. Finding the teats and applying the teatcups to the teats is for a relatively small number of animals a difficult task. However, for a majority of the animals this may be done within a relatively short time period. Consequently, this embodiment proposes in the first place to perform a normal mode of operation for finding the teats and applying the teatcups to the teats. This normal mode of operation may last for said relatively short period of time within which for a majority of the animals the finding of the teats and the application of the teatcups to the teats will succeed. For the relatively small number of animals for which this did not succeed a special mode of operation may be utilized in a following milking procedure, in which mode of operation for example more time may be spent. In this way the milking machine is better utilized and the overall capacity of the milking machine is improved. In particular said predetermined number of teats includes all the teats of the animal. Moreover, said special mode of operation may follow a more sophisticated search algorithm than said normal mode, which increases the probability that the applying means finds all the teats of an animal. Said special mode of operation may also comprise repetition of the search algorithm a predetermined number of times. Thereby this repeated search algorithm may be the same as in the normal mode of operation or a more sophisticated search algorithm.

According to another embodiment of the invention it is determined in the determining steps that the milking does not succeed if the milk amount from a teat is less than a predetermined value. This may be due to the fact that for example the stimulation period is too short, the animal suffers from an illness, such as mastitis, etc, and by determining this defect the animal may be treated according to a special mode of operation in a following milking procedure. In particular the recording step may comprise recording the teat from which the milk amount is less than a predetermined value. Said special mode of operation may comprise operational measures to increase the milk extraction from said recorded teat.

The object defined above is also obtained by the initially defined milking apparatus comprising first milking means adapted to perform milking of an animal in a first normal mode, determining means adapted to determine whether the milking of the animal by the first milking means succeed, and second milking means adapted to perform milking of the animal in a special mode in response to the determining means determining that the milking of the animal by the first milking means did not succeed.

BRIEF DESCRIPTION OF THE DRAWINGS

Different embodiments of the present invention will now be described by way of example with reference to the accompanying drawings in which.

DETAILED DESCRIPTION OF THE DRAWINGS

Figure 1:
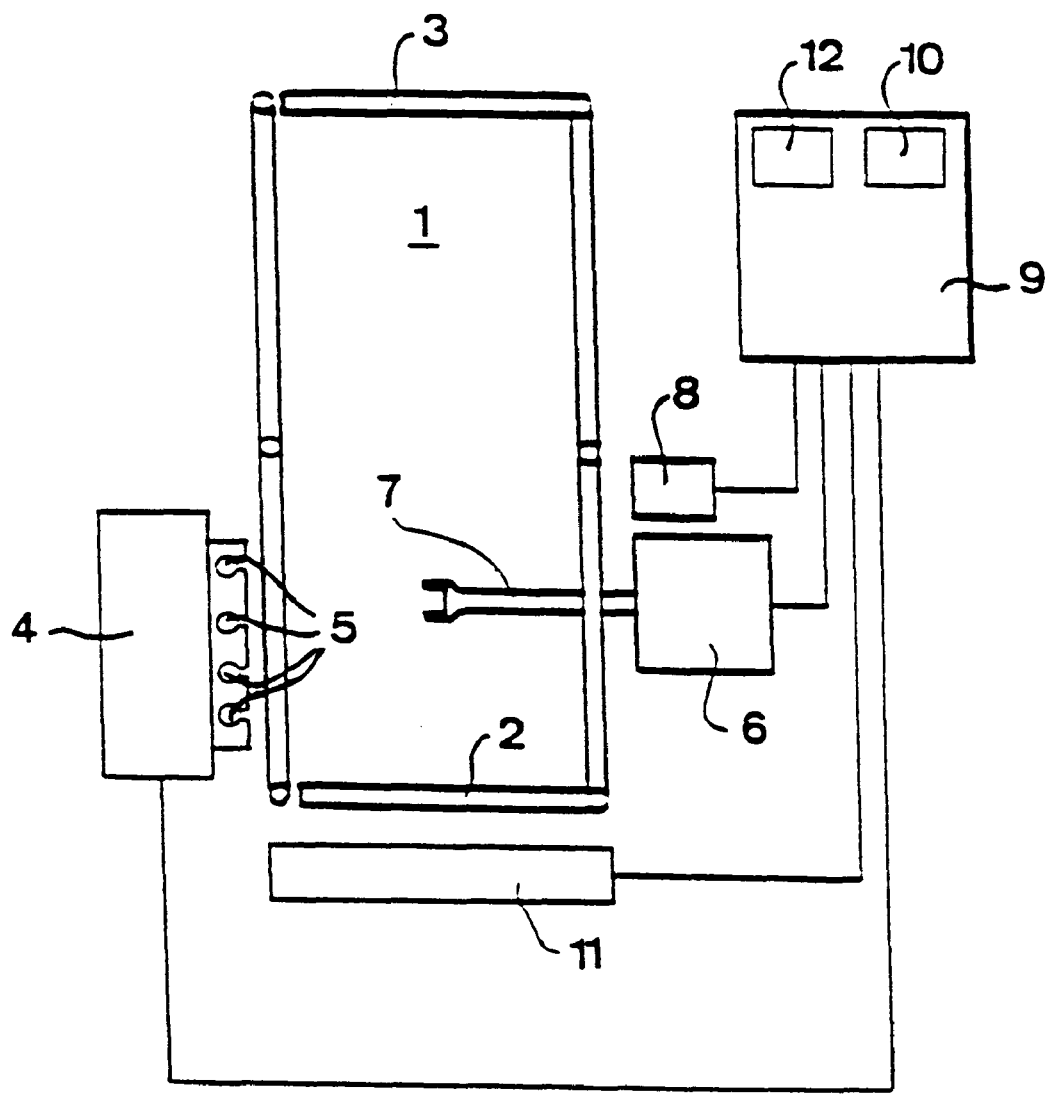
FIG. 1 shows a view of a milking station.

FIG. 1 discloses a milking station adapted for milking of cows and comprising a milking stall 1 with an entrance 2 and an exit 3. Close to the milking stall 1 there is provided an automatic milking apparatus comprising a milking machine 4, which is partly disclosed in FIG. 1. In this example the term "automatic" means that the milking procedure may be performed without any manual activity of an operator, although the present invention also is applicable to milking apparatuses not being fully automated, e.g. the teat cups are manually applied to the teats. The milking machine 4 comprises four teatcups 5 to be applied to the teats of a cow to be milked. The milking apparatus also comprises applying means 6 for automatically applying the teatcups 5 to the teats. The applying means 6 will be defined as a robot 6 in the following description. The robot 6 comprises a robot arm 7 which is adapted to engage a teatcup 5 supported in a rest position at the milking machine 4, bring it to the teat of the cow and attach it to the teat. Furthermore, the milking apparatus comprises a schematically disclosed sensing device 8 which is adapted to sense the exact position of each teat of the cow. The sensing device 8 is connected to a control device 9 which in turn is connected to the robot 6 and the robot arm 7, and thus the control device 9 may bring the robot arm 7 to the position sensed by the sensing device 8. The sensing device 8 may utilize optical means for recognizing and locating the teats and for example it may comprise a video camera. The control device 9 may comprise a computerized unit 10 for treating the picture delivered by the video camera of the sensing device 8. Moreover an identification device 11 is provided at the entrance 2 of the milking stall 1 to identify the cow entering the milking stall 1. The identification device 11 is connected to the control device 9 in which facts about each cow are stored in a data base in a memory device 12. These facts may for example be when the cow was last milked, for which teats the milking machine 4 managed to apply the teatcups 5, the milk amount from each teat, health situation, lactation situation, milking result during a series of the last milkings, preliminary position of the teats, etc. Each teatcup 5 of the milking machine 4 may comprise a sensor which is adapted to sense firstly whether the teatcup 5 is correctly applied to the teat and secondly the milk flow from the teat, by which the milk amount from each teat may be determined by the control device 9. Alternatively there may be different sensors for each of these functions.

The control device 9 may be preprogrammed to perform milking according to a normal mode of operation, according to which the milking follows a suitable, more or less rough procedure which has proved to be successful for a majority of cows. This normal mode of operation may be preprogrammed during the manufacture of the milking machine 4 and the control device 9, or it may be preprogrammed during the first initial milking procedures of the milking machine 4 and the control device 9. This normal mode of operation should be an optimized balance between success rate and the time spent for each milking procedure. The control device 9 is also preprogrammed to perform milking according to a special mode of operation in response to the facts concerning an individual cow and stored in the data base. This special mode of operation comprises a more flexible manner of milking the animal than the normal mode of operation, and it may be adapted to each individual cow and should be optimized to reach a very high success rate.

The milking station may be operated in the following manner. When a cow enters the milking stall 1 she is identified by the identification device 11. In response to the facts stored in the data base of the memory device 12, the control device 9 will perform milking according to a normal mode of operation, i.e. in the case that the facts indicate that for example the last milking did succeed, the cow does not suffer from any diseases, etc. Then the robot arm 7 picks up a first teatcup 5 and brings it to a preliminary position in accordance with the facts stored in the data base. By means of the sensing device 8 the exact position of the teats is determined and the robot arm 7 is brought to the position of the first teat, whereafter the robot arm 7 attaches the first teatcup 5 to the first teat. The other teatcups 5 are applied to the teats in a similar manner. When the teatcups 5 are applied to the teats the milking procedure is initiated. After a predetermined stimulation period a main milking period by means of normal milking parameters, such as milking vacuum level, pulsating vacuum level, pulsator ratio, pulsating frequency etc, is performed. If the sensing device 8 and the robot arm 7 do not manage to find a teat and to attach a teatcup 5 to a teat, milking of the other teats is continued and the data base of the memory device 12 is updated by the fact that one teat was not found. If during milking it is recognized by means of the sensor 13 that no milk flows from one of the teats, the milking of the other teats may be continued and it is determined by the control device to interrupt milking of this one teat. The data base is also updated with regard to the interrupted milking.

When on the other hand a cow entering the milking stall 1 and the facts concerning this identified cow indicate that the last milking did not succeed the control device 9 will perform the milking procedure according to a special mode of operation. If the facts indicate that the milking did not succeed due to the fact that the sensing device 8 did not find a teat of the cow, this special mode of operation may comprise a more sophisticated search algorithm or repetition of the search algorithm a predetermined number of times, in order to ensure that this teat will be found or to increase the probability that this teat will be found. If the teat is found during this special mode of operation the data base is updated and if the position lies within an area which might have been expected, the cow may be milked according to the normal mode of operation in the following milking procedure. If during the special mode of operation the sensing device 8 and the control device 9 do not manage to find the teat, the data base is updated and it might be determined that the cow is to be separated or is to be milked according to a special mode of operation in the following milking procedure.

In an alternative embodiment there may be one milking station provided for milking the cows according to the normal mode of operation and another milking station provided for milking the cows according to the special mode of operation. In this case means may be provided to entice the cow to enter the milking station in which it should be milked according to the facts stored in the data base.

Figure 2:
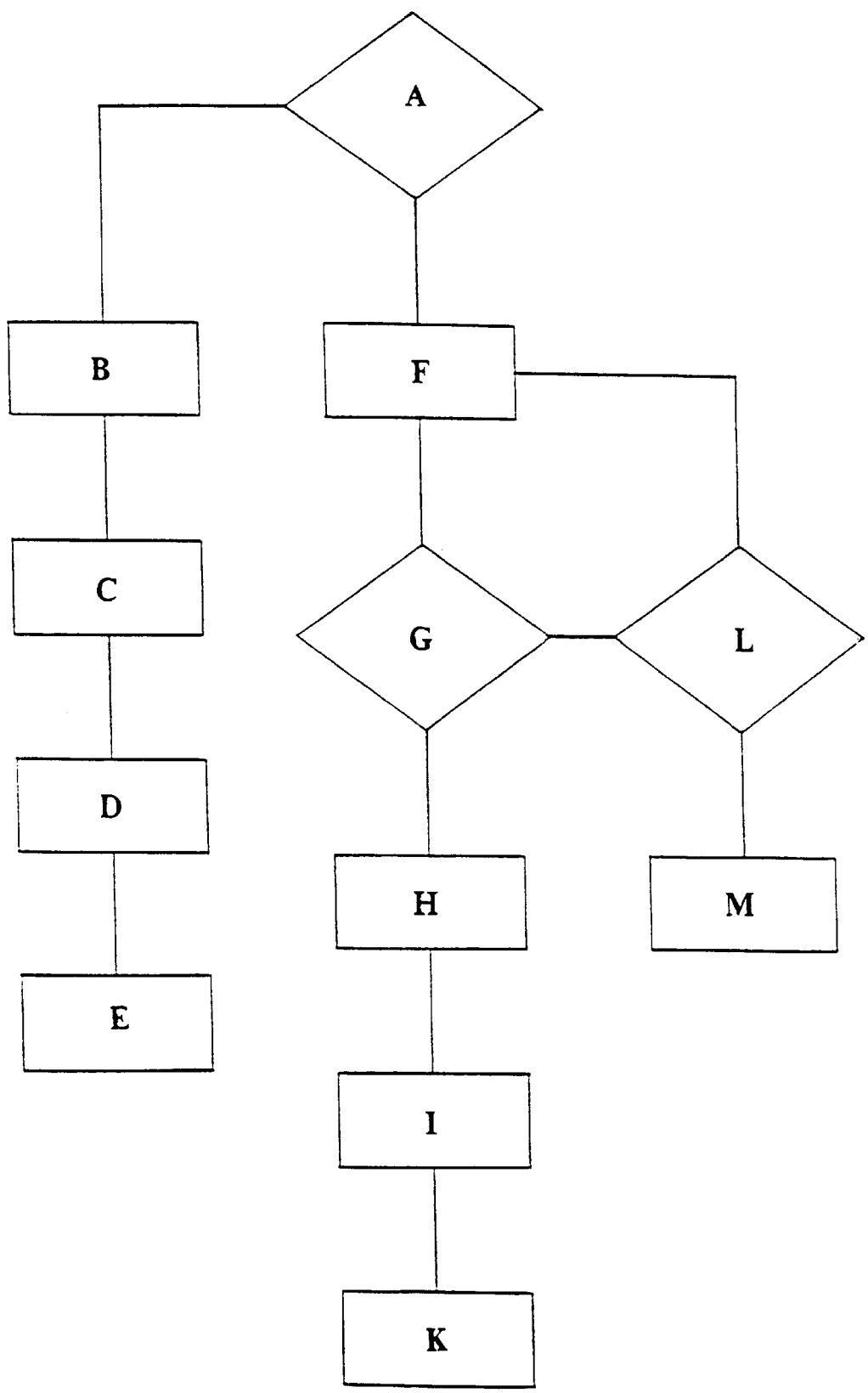
FIG. 2 shows a flow chart illustrating the steps to be taken in order to perform milking.

The flow chart of FIG. 2 illustrates one example of performing the present invention. When a cow enters the milking stall 1 it is considered, box A, whether all teats were milked at the last milking occasion. If so, the cow is milked according to the normal mode of operation, box B, the teatcups 5 are attached, box C, the cow is milked, box D, and the data base is updated, box E, by the result of the milking.

If all the teats were not milked at the last milking occasion, cf. box A, the cow will be milked according to a special mode of operation, box F. This special mode of operation may comprise a more sophisticated search algorithm for locating the teats. If all the teats are found, box G, the teatcups 5 are attached to the teats, box H, the cow is milked, box I, and the data base is updated, box K, by the result of the milking. If all the teats, box G, are not found, the search algorithm may be repeated a predetermined number of times, box L. If still the teats are not found, milking may be interrupted, box M, and the cow may be separated for special treatment.

We claim:

1. A method of milking animals by the use of at least one milking apparatus comprising teatcups and applying means provided to apply automatically the teatcups to the teats of the animal, said method comprising the following steps:

operating the milking apparatus in a normal mode of operation of the applying means during a first milking procedure for each animal;

automatically determining when the milking of an animal during said first milking procedure does not succeed; and automatically operating the milking apparatus in a special mode of operation of the applying means during a following second milking procedure of the animal for which the milking did not succeed in the first milking procedure.

2. A method of milking according to claim 1, further comprising the step of recording the animal for which the milking of said first milking procedure did not succeed.

3. A method of milking according to claim 2, wherein the recording step comprises recording the teat and the animal for which the milking did not succeed.

4. A method of milking according to claim 3, wherein said operating step in a normal mode comprises completing the milking of the teats of an animal for which teats milking does succeed.

5. A method of milking according to claim 2, wherein the recording step comprises recording the teat from which the milk amount is less than a predetermined value.

6. A method of milking according to claim 1, wherein said special mode of operation comprises the step of identifying the reason why the milking did not succeed in the first milking procedure.

7. A method of milking according to claim 1, wherein said special mode of operation comprises a more sophisticated treatment of the animal then said normal mode in order to enable the milking procedure to succeed.

8. A method of milking according to claim 1, wherein said special mode of operation is performed when a predetermined time interval has elapsed since a first of a series of unsuccessful milkings.

9. A method of milking according to claim 1, wherein the determining step comprises determining when the milking of a teat of an animal does not succeed.

10. A method of milking according to claim 1, wherein said normal and special modes of operation are performed in the same milking apparatus.

11. A method of milking according to claim 1, wherein at least two milking apparatuses are used and wherein said normal and special modes of operation are performed in the two milking apparatuses, respectively.

12. A method of milking according to claim 1, wherein the applying means in said normal mode of operation follows a normal search algorithm for finding the teats and applying the teatcups to the teats, and wherein in the determining step it is determined that the milking does not succeed if the applying means does not find a predetermined number of teats or does not succeed in applying the teatcups to said predetermined number of the teats.

13. A method of milking according to claim 12, wherein said predetermined number of teats includes all the teats of the animal.

14. A method of milking according to claim 12, wherein said special mode of operation follows a more sophisticated search algorithm than said normal mode, which increases the probability that the applying means finds all the teats of an animal.

15. A method of milking according to claim 12, wherein said special mode of operation comprises repetition of the search algorithm a predetermined number of times.

16. A method of milking according to claim 1, wherein in the determining step it is determined that the milking does not succeed if the milk amount from a teat is less than a predetermined value.

17. A method of milking according to claim 16, wherein said special mode of operation comprises operational measures to increase the milking extraction from said recorded teat.

18. A milking apparatus comprising:
   teatcups and applying means provided to apply automatically the teatcups to the teats of the animal;
   first milking means adapted to perform milking of an animal in a first normal mode of operation of the applying means;
   determining means adapted to determine whether the milking of the animal by the first milking means succeed; and
   second milking means adapted to perform milking of the animal in a special mode of operation of the applying means in response to the determining means determining that the milking of the animal by the first milking means did not succeed.

19. A milking apparatus according to claim 18, further comprising recording means adapted to record the animal for which the milking by said first milking means did not succeed.

20. A milking apparatus according to claim 18, wherein the determining means comprises means adapted to determine whether a teatcup is correctly applied to a teat.

21. A milking apparatus according to claim 18, wherein the determining means comprises means adapted to determine that the milk amount is less than a predetermined value.

22. A milking apparatus according to claim 18, further comprising control means adapted to control the milking means to perform milking according to the first normal mode or the second special mode.

* * * * *